United States Patent
Smith et al.

(10) Patent No.: US 11,015,534 B2
(45) Date of Patent: May 25, 2021

(54) THERMAL MANAGEMENT SYSTEM

(71) Applicant: General Electric Company, Schenectady, NY (US)

(72) Inventors: Justin Paul Smith, Montgomery, OH (US); Brandon Wayne Miller, Liberty Township, OH (US); Daniel Alan Niergarth, Norwood, OH (US)

(73) Assignee: General Electric Company

( * ) Notice: Subject to any disclaimer, the term of this patent is extended or adjusted under 35 U.S.C. 154(b) by 135 days.

(21) Appl. No.: 16/202,747

(22) Filed: Nov. 28, 2018

(65) Prior Publication Data

US 2020/0165982 A1 May 28, 2020

(51) Int. Cl.
*F02C 9/00* (2006.01)
*F02C 7/16* (2006.01)
*F02C 7/18* (2006.01)

(52) U.S. Cl.
CPC .................. *F02C 9/00* (2013.01); *F02C 7/16* (2013.01); *F02C 7/185* (2013.01); *F05D 2220/36* (2013.01); *F05D 2220/62* (2013.01); *F05D 2260/205* (2013.01); *F05D 2260/213* (2013.01); *F05D 2270/20* (2013.01); *F05D 2270/303* (2013.01); *F05D 2270/44* (2013.01)

(58) Field of Classification Search
CPC .... F02C 9/00; F02C 7/16; F02C 7/185; F05D 2260/205; F05D 2260/213
See application file for complete search history.

(56) References Cited

U.S. PATENT DOCUMENTS 2,582,842 A   1/1952   Messinger
2,720,313 A   10/1955  Pattison
(Continued)

FOREIGN PATENT DOCUMENTS

EP   1609954 A1   12/2005
EP   1798381 A2   6/2007
(Continued)

OTHER PUBLICATIONS

U.S. Appl. No. 15/796,991, filed Oct. 31, 2017.
(Continued)

*Primary Examiner* — Steven M Sutherland
(74) *Attorney, Agent, or Firm* — Dority & Manning, P A.

(57) ABSTRACT

A thermal management system includes a first heat source assembly including a first heat source exchanger, a first thermal fluid inlet line extending to the first heat source exchanger, and a first thermal fluid outlet line extending from the first heat source exchanger; a second heat source assembly including a second heat source exchanger, a second thermal fluid inlet line extending to the second heat source exchanger, and second a thermal fluid outlet line extending from the second heat source exchanger; a shared assembly including a thermal fluid line and a heat sink exchanger, the shared assembly defining an upstream junction in fluid communication with the first thermal fluid outlet line and second thermal fluid outlet line and a downstream junction in fluid communication with the first thermal fluid inlet line and second thermal fluid inlet line; and a controller configured to selectively fluidly connect the first heat source assembly or the second heat source assembly to the shared assembly.

9 Claims, 4 Drawing Sheets

(56) References Cited

U.S. PATENT DOCUMENTS

| | | |
|---|---|---|
| 2,893,628 A | 7/1959 | Herman |
| 3,050,240 A | 8/1962 | Darnell |
| 3,164,955 A | 1/1965 | Garraway |
| 3,178,105 A | 4/1965 | Darnell |
| 3,557,554 A | 1/1971 | Martinek et al. |
| 3,590,559 A | 7/1971 | Bragg |
| 3,621,654 A | 11/1973 | Hull |
| 3,769,789 A | 11/1973 | Niggemann |
| 3,847,298 A | 11/1974 | Hamilton |
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,229,944 A | 10/1980 | Weiler |
| 4,317,646 A | 3/1982 | Steel et al. |
| 4,449,372 A | 5/1984 | Rilett |
| 4,503,682 A | 3/1985 | Rosenblatt |
| 4,505,124 A | 3/1985 | Mayer |
| 4,525,998 A | 7/1985 | Schwarz |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 4,826,397 A | 5/1989 | Shook et al. |
| 4,928,240 A | 5/1990 | Davison et al. |
| 4,991,394 A | 2/1991 | Wright |
| 5,012,420 A | 4/1991 | Walker et al. |
| 5,149,018 A | 9/1992 | Clark |
| 5,174,714 A | 12/1992 | Plemmons et al. |
| 5,181,559 A | 1/1993 | Svoboda |
| 5,267,608 A | 12/1993 | Coffinberry |
| 5,269,133 A | 12/1993 | Wallace |
| 5,341,636 A | 8/1994 | Paul |
| 5,399,066 A | 3/1995 | Ritchie et al. |
| 5,414,992 A | 5/1995 | Glickstein |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Horner |
| 5,730,088 A | 3/1998 | Foley et al. |
| 5,899,660 A | 5/1999 | Dodd |
| 5,904,836 A | 5/1999 | Lee et al. |
| 6,106,229 A | 8/2000 | Nikkanen et al. |
| 6,134,876 A | 10/2000 | Hines et al. |
| 6,182,435 B1 | 2/2001 | Niggemann et al. |
| 6,224,328 B1 | 5/2001 | Weigand et al. |
| 6,250,097 B1 | 6/2001 | Lui et al. |
| 6,294,091 B1 | 9/2001 | Hoff |
| 6,321,552 B1 | 11/2001 | Frederiksen |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,702,729 B2 | 3/2004 | Mazzuca |
| 6,817,189 B2 | 11/2004 | Boeck |
| 6,892,710 B2 | 5/2005 | Ekstam |
| 6,939,392 B2 | 9/2005 | Huang et al. |
| 6,974,306 B2 | 12/2005 | Djeridane et al. |
| 7,093,437 B2 | 8/2006 | Spadaccini et al. |
| 7,254,937 B2 | 8/2007 | Hull et al. |
| 7,254,951 B2 | 8/2007 | Lockwood, Jr. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,448,217 B2 | 11/2008 | Savic et al. |
| 7,459,081 B2 | 12/2008 | Koenig et al. |
| 7,491,029 B2 | 2/2009 | Pezzetti, Jr. et al. |
| 7,503,179 B2 | 3/2009 | Estridge et al. |
| 7,536,851 B2 | 5/2009 | McLain |
| 7,569,099 B2 | 8/2009 | Coffin et al. |
| 7,597,537 B2 | 10/2009 | Bucaro et al. |
| 7,628,965 B2 | 12/2009 | Johnson et al. |
| 7,681,339 B2 | 3/2010 | Orlando et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,823,389 B2 | 11/2010 | Seitzer et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,946,806 B2 | 5/2011 | Murphy |
| 7,966,807 B2 | 6/2011 | Norris et al. |
| 7,987,676 B2 | 8/2011 | Ast et al. |
| 8,055,437 B2 | 11/2011 | Proietty et al. |
| 8,056,345 B2 | 11/2011 | Norris et al. |
| 8,126,628 B2 | 2/2012 | Hershey et al. |
| 8,141,360 B1 | 3/2012 | Huber |
| 8,162,593 B2 | 4/2012 | Guimbard et al. |
| 8,177,884 B2 | 5/2012 | Schmidt et al. |
| 8,205,426 B2 | 6/2012 | Schilling |
| 8,231,714 B2 | 7/2012 | Cornet et al. |
| 8,261,528 B2 | 9/2012 | Chillar et al. |
| 8,266,888 B2 | 9/2012 | Liu |
| 8,302,399 B1 | 11/2012 | Freund et al. |
| 8,307,662 B2 | 11/2012 | Turco |
| 8,342,798 B2 | 1/2013 | Floyd, II et al. |
| 8,371,127 B2 | 2/2013 | Durocher et al. |
| 8,388,830 B2 | 3/2013 | Sohn et al. |
| 8,434,997 B2 | 5/2013 | Pinero et al. |
| 8,438,835 B2 | 5/2013 | Perveiler et al. |
| 8,450,020 B2 | 5/2013 | Sinha et al. |
| 8,459,040 B2 | 6/2013 | Glahn et al. |
| 8,490,382 B2 | 7/2013 | Zysman et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,627,662 B2 | 1/2014 | Freund et al. |
| 8,663,996 B2 | 3/2014 | Beeson |
| 8,756,910 B2 | 6/2014 | Donovan et al. |
| 8,763,363 B2 | 7/2014 | Ranganathan |
| 8,765,070 B2 | 7/2014 | Norton et al. |
| 8,776,952 B2 | 7/2014 | Schwarz et al. |
| 8,783,040 B2 | 7/2014 | Erickson et al. |
| 8,789,377 B1 | 7/2014 | Brostmeyer |
| 8,821,362 B2 | 9/2014 | Kidd et al. |
| 8,828,344 B2 | 9/2014 | K-WLam et al. |
| 8,858,161 B1 | 10/2014 | Ryznic et al. |
| 8,881,397 B1 | 11/2014 | Dowd |
| 8,899,008 B2 | 12/2014 | Jones et al. |
| 8,944,367 B2 | 2/2015 | Bystry, Jr. et al. |
| 8,961,114 B2 | 2/2015 | Ruthemeyer |
| 8,978,353 B2 | 3/2015 | Norton et al. |
| 8,984,884 B2 | 3/2015 | Xu et al. |
| 8,998,563 B2 | 4/2015 | Rioux |
| 9,004,853 B2 | 4/2015 | Puerta et al. |
| 9,014,791 B2 | 4/2015 | Held |
| 9,038,397 B2 | 5/2015 | Papa et al. |
| 9,079,803 B2 | 7/2015 | Xu |
| 9,109,608 B2 | 8/2015 | Little et al. |
| 9,120,580 B2 | 9/2015 | Sampath |
| 9,144,768 B2 | 9/2015 | Tichborne et al. |
| 9,162,162 B2 | 10/2015 | Yount |
| 9,212,623 B2 | 12/2015 | Murphy et al. |
| 9,231,267 B2 | 1/2016 | McAlister |
| 9,243,563 B2 | 1/2016 | Lo |
| 9,260,974 B2 | 2/2016 | Hasting et al. |
| 9,297,391 B2 | 3/2016 | Rued et al. |
| 9,341,074 B2 | 5/2016 | Schimmels et al. |
| 9,410,482 B2 | 8/2016 | Krautheim et al. |
| 9,422,063 B2 | 8/2016 | Diaz |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,581,081 B2 | 2/2017 | Biyani et al. |
| 9,587,561 B2 | 3/2017 | Snyder et al. |

(56) References Cited

U.S. PATENT DOCUMENTS

| | | | |
|---|---|---|---|
| 9,611,744 B2 | 4/2017 | Taylor | |
| 9,656,187 B2 | 5/2017 | Lo et al. | |
| 9,687,773 B2 | 6/2017 | Johnson et al. | |
| 9,724,625 B2 | 8/2017 | Lo | |
| 9,752,507 B2 | 9/2017 | Selstad et al. | |
| 9,771,867 B2 | 9/2017 | Karam et al. | |
| 9,776,727 B2 | 10/2017 | Ellis et al. | |
| 9,834,315 B2 | 12/2017 | Lo et al. | |
| 9,863,322 B2 | 1/2018 | Williams | |
| 9,885,290 B2 | 2/2018 | Della-Fera et al. | |
| 9,897,054 B2 | 2/2018 | Lo et al. | |
| 2007/0086887 A1 | 4/2007 | Pezzetti, Jr. et al. | |
| 2009/0133380 A1 | 5/2009 | Donnerhack | |
| 2009/0158739 A1 | 6/2009 | Messmer | |
| 2009/0188234 A1 | 7/2009 | Suciu et al. | |
| 2010/0212857 A1 | 8/2010 | Bulin et al. | |
| 2010/0313591 A1 | 12/2010 | Lents et al. | |
| 2011/0000227 A1 | 1/2011 | Kamiya | |
| 2011/0027068 A1 | 2/2011 | Floyd, II et al. | |
| 2011/0171007 A1 | 7/2011 | Johnson et al. | |
| 2011/0262309 A1 | 10/2011 | Limaye et al. | |
| 2012/0128467 A1 | 5/2012 | Ruthemeyer | |
| 2012/0216502 A1 | 8/2012 | Freund et al. | |
| 2012/0216677 A1 | 8/2012 | Koenig et al. | |
| 2013/0015609 A1 | 1/2013 | Landau | |
| 2013/0186100 A1 | 7/2013 | Rhoden et al. | |
| 2013/0233526 A1 | 9/2013 | Hislop | |
| 2013/0280081 A1 | 10/2013 | Propheter-Hinckley et al. | |
| 2013/0302154 A1 | 11/2013 | Finlayson | |
| 2014/0000275 A1 | 1/2014 | Kesseli et al. | |
| 2014/0030066 A1 | 1/2014 | Schimmels et al. | |
| 2014/0140829 A1* | 5/2014 | Blair | F02C 7/14 |
| | | | 415/177 |
| 2014/0161601 A1 | 6/2014 | Geiger | |
| 2014/0165570 A1 | 6/2014 | Herring | |
| 2014/0205446 A1 | 7/2014 | Patsouris et al. | |
| 2014/0216042 A1 | 8/2014 | Hanson | |
| 2014/0321984 A1 | 10/2014 | Welch et al. | |
| 2014/0345254 A1 | 11/2014 | Dawson et al. | |
| 2014/0345292 A1 | 11/2014 | Diaz et al. | |
| 2014/0360153 A1 | 12/2014 | Papa et al. | |
| 2015/0000291 A1 | 1/2015 | Smith et al. | |
| 2015/0040986 A1 | 2/2015 | Tichborne et al. | |
| 2015/0072850 A1 | 3/2015 | Derrick et al. | |
| 2015/0159867 A1 | 6/2015 | Patrick et al. | |
| 2015/0369129 A1* | 12/2015 | Saikaly | F02C 7/143 |
| | | | 60/783 |
| 2016/0003160 A1 | 1/2016 | Hagshenas | |
| 2016/0096629 A1 | 4/2016 | Vaisman | |
| 2016/0108814 A1 | 4/2016 | Schmitz | |
| 2016/0131035 A1 | 5/2016 | Diaz et al. | |
| 2016/0131036 A1 | 5/2016 | Bintz et al. | |
| 2016/0138431 A1 | 5/2016 | Lear, Jr. | |
| 2016/0167802 A1 | 6/2016 | Lo et al. | |
| 2016/0178285 A1 | 6/2016 | Pal et al. | |
| 2016/0186606 A1 | 6/2016 | Blaney et al. | |
| 2016/0195017 A1 | 7/2016 | Vick | |
| 2016/0201989 A1 | 7/2016 | Martinez et al. | |
| 2016/0208759 A1 | 7/2016 | Lo et al. | |
| 2016/0245144 A1 | 8/2016 | Selberg et al. | |
| 2016/0265393 A1 | 9/2016 | Fleszar | |
| 2016/0290214 A1 | 10/2016 | Ekanayake et al. | |
| 2016/0290233 A1 | 10/2016 | Ekanayake et al. | |
| 2016/0305440 A1 | 10/2016 | Laboda et al. | |
| 2016/0312702 A1 | 10/2016 | Thomas | |
| 2016/0326915 A1 | 11/2016 | Baladi | |
| 2016/0369700 A1 | 12/2016 | Ribarov et al. | |
| 2016/0369706 A1 | 12/2016 | Suciu et al. | |
| 2017/0030266 A1 | 2/2017 | Cerny et al. | |
| 2017/0033641 A1 | 2/2017 | Pera et al. | |
| 2017/0096910 A1 | 4/2017 | Raimarckers et al. | |
| 2017/0113807 A1 | 4/2017 | Burnell et al. | |
| 2017/0114667 A1 | 4/2017 | Sabo et al. | |
| 2017/0114721 A1 | 4/2017 | Miller et al. | |
| 2017/0122210 A1 | 5/2017 | Schwarz et al. | |
| 2017/0122254 A1* | 5/2017 | Urch | F01K 27/02 |
| 2017/0138372 A1 | 5/2017 | Subramanian et al. | |
| 2017/0141419 A1 | 5/2017 | Wu et al. | |
| 2017/0152765 A1 | 6/2017 | Uechi et al. | |
| 2017/0159566 A1 | 6/2017 | Sennoun et al. | |
| 2017/0159675 A1 | 6/2017 | Sennoun et al. | |
| 2017/0167382 A1 | 6/2017 | Miller et al. | |
| 2017/0175563 A1 | 6/2017 | Chaudhari et al. | |
| 2017/0184024 A1 | 6/2017 | Sennoun | |
| 2017/0204807 A1 | 7/2017 | Chillapalli et al. | |
| 2017/0254229 A1 | 9/2017 | Fletcher | |
| 2017/0291714 A1 | 10/2017 | Corman | |
| 2018/0016025 A1 | 1/2018 | Rheaume et al. | |
| 2018/0045080 A1 | 2/2018 | Uechi et al. | |
| 2018/0045432 A9 | 2/2018 | Vaisman et al. | |
| 2018/0056233 A1 | 3/2018 | Henson et al. | |
| 2018/0056234 A1 | 3/2018 | Weng et al. | |
| 2018/0071659 A1 | 3/2018 | Rhoden | |
| 2018/0118367 A1 | 5/2018 | Rheaume et al. | |
| 2018/0156056 A1 | 6/2018 | Bonacum et al. | |

FOREIGN PATENT DOCUMENTS

| | | |
|---|---|---|
| EP | 2003311 A2 | 12/2008 |
| EP | 3018304 A1 | 5/2016 |
| EP | 3075957 A1 | 10/2016 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO 2002/038938 A1 | 5/2002 |
| WO | WO 2006/079438 A1 | 8/2006 |
| WO | WO 2011/038188 A1 | 3/2011 |
| WO | WO 2014/051678 A1 | 4/2014 |
| WO | WO 2015/012911 A2 | 1/2015 |
| WO | WO 2015/069145 A1 | 5/2015 |

OTHER PUBLICATIONS

U.S. Appl. No. 15/819,327, filed Nov. 21, 2017.
U.S. Appl. No. 15/899,831, filed Feb. 20, 2018.
U.S. Appl. No. 15/819,443, filed Nov. 21, 2017.
U.S. Appl. No. 15/861,802, filed Jan. 4, 2018.
Wright et al., Workshop on New Cross-cutting Technologies for Nuclear Power Plants, SuperCritical Technologies, MIT: Cambridge, MA, Jan. 30-31, 2017, 25 pages. https://energy.mit.edu/wp-content/uploads/2017/02/2-5.-U-Wisc-SCT-MIT_slides_V4b-min.pdf.
Kelburn Engineering, Landfill, Sewage, Biogas, Coal, Seam & Mines Gas Separation/Filtration, Kelburn Engineering—LandfillGas and Air Separation, 3 pages. http://www.kelburneng.co.uk/landfill-gas-gallery.php.
https://www.digitalcombatsimulator.com/en/ (Website Link Only).

* cited by examiner

THERMAL MANAGEMENT SYSTEM

FIELD

The present subject matter relates generally to a thermal management system and a method for operating the same.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight and/or to power a load, such as an electrical generator.

In at least certain embodiments, the turbomachine and fan are at least partially surrounded by an outer nacelle. With such embodiments, the outer nacelle defines a bypass airflow passage with the turbomachine. Additionally, the turbomachine is supported relative to the outer nacelle by one or more outlet guide vanes/struts. During operation of the gas turbine engine, various systems may generate a relatively large amount of heat. Thermal management systems of the gas turbine engine may collect heat from one or more of these systems to maintain a temperature of such systems within an acceptable operating range. The thermal management systems may reject such heat through one or more heat exchangers.

However, the inventors of the present disclosure have found that further benefits may be achieved by operating the thermal management system to selectively add or remove heat from various systems or locations of the gas turbine engine. Accordingly, a system and/or method for operating a thermal management system in a manner to increase an efficiency of the gas turbine engine would be useful.

BRIEF DESCRIPTION

Aspects and advantages of the invention will be set forth in part in the following description, or may be obvious from the description, or may be learned through practice of the invention.

In one exemplary aspect of the present disclosure, a gas turbine engine is provided. The gas turbine engine includes a compressor section, a combustion section, a turbine section, and an exhaust section arranged in series flow; and a thermal management system operable with at least one of the compressor section, the combustion section, the turbine section, or the exhaust section. The thermal management system includes a first heat source assembly including a first heat source exchanger, a first thermal fluid inlet line extending to the first heat source exchanger, and a first thermal fluid outlet line extending from the first heat source exchanger; a second heat source assembly including a second heat source exchanger, a second thermal fluid inlet line extending to the second heat source exchanger, and second a thermal fluid outlet line extending from the second heat source exchanger; a shared assembly including a thermal fluid line and a heat sink exchanger, the shared assembly defining an upstream junction in fluid communication with the first thermal fluid outlet line and second thermal fluid outlet line and a downstream junction in fluid communication with the first thermal fluid inlet line and second thermal fluid inlet line; and a controller configured to selectively fluidly connect the first heat source assembly or the second heat source assembly to the shared assembly.

In certain exemplary embodiments the first heat source exchanger is a cooled cooling air heat source exchanger, and wherein the second heat source exchanger is a waste heat recovery heat source exchanger in thermal communication with the turbine section, the exhaust section, or both.

In certain exemplary embodiments the first heat source exchanger is a waste heat recovery heat source exchanger, or a lubrication oil heat source exchanger.

In certain exemplary embodiments the heat sink exchanger of the shared assembly is a fuel heat sink exchanger, a bypass passage heat sink exchanger, a compressor discharge heat sink exchanger, a ram air heat sink exchanger, or a free stream heat sink exchanger.

In certain exemplary embodiments the thermal management system includes a valve positioned at the upstream junction of the shared assembly or at the downstream junction of the shared assembly, and wherein the controller is operably coupled to the valve for selectively fluidly connecting the first heat source assembly or the second heat source assembly to the shared assembly.

In certain exemplary embodiments the shared assembly includes a thermal fluid pump for providing a flow of thermal fluid through the shared assembly and the first heat source assembly when the controller fluidly connects the shared assembly to the first heat source assembly, and through the shared assembly and the second heat source assembly when the controller fluidly connects the shared assembly to the second heat source assembly.

In certain exemplary embodiments the thermal management system is configured to utilize a supercritical thermal transfer fluid, and wherein the shared assembly includes a supercritical thermal fluid pump for providing a flow of supercritical thermal fluid through the shared assembly and the first heat source assembly when the controller fluidly connects the shared assembly to the first heat source assembly, and through the shared assembly and the second heat source assembly when the controller fluidly connects the shared assembly to the second heat source assembly.

In certain exemplary embodiments the shared assembly includes a turbine in flow communication with the thermal fluid line for extracting energy from a thermal fluid flow through the thermal fluid line of the shared assembly.

In certain exemplary embodiments the gas turbine engine further includes one or more sensors for sensing data indicative of one or more parameters of the gas turbine engine, wherein the controller of the thermal management system is operably coupled to the one or more sensors, and wherein the controller is configured to selectively fluidly connect the first heat source assembly or the second heat source assembly to the shared assembly in response to the data sensed by the one or more sensors.

In certain exemplary embodiments the first heat source assembly defines a first maximum thermal fluid throughput, wherein the second heat source assembly defines a second maximum thermal fluid throughput, wherein the shared assembly defines a third maximum thermal fluid throughput, wherein the first maximum thermal fluid throughput is substantially equal to the second maximum thermal fluid throughput, and wherein the second maximum thermal fluid throughput is substantially equal to the third maximum thermal fluid throughput.

In an exemplary aspect of the present disclosure, a method is provided of operating a thermal management system for a gas turbine engine. The method includes providing a thermal transfer fluid through a shared assembly of the thermal management system and to a first heat source assembly of the thermal management system, the shared assembly including a heat sink exchanger; sensing data indicative of a gas turbine engine operating parameter; and providing the thermal transfer fluid through the shared assembly of the thermal management system and to a second heat source assembly of the thermal management system in response to sensing data indicative of the gas turbine engine parameter.

In certain exemplary aspects sensing data indicative of the gas turbine engine parameter includes sensing data indicative of a temperature parameter of the gas turbine engine.

For example, in certain exemplary aspects sensing data indicative of the temperature parameter of the gas turbine engine includes sensing data indicative of the temperature parameter passing a predetermined threshold.

In certain exemplary aspects providing the thermal transfer fluid through the shared assembly of the thermal management system and to the first heat source assembly of the thermal management system includes providing substantially all of the thermal transfer fluid from the shared assembly of the thermal management system to the first heat source assembly of the thermal management system.

For example, in certain exemplary aspects providing the thermal transfer fluid through the shared assembly of the thermal management system and to the second heat source assembly of the thermal management system includes providing substantially all of the thermal transfer fluid from the shared assembly of the thermal management system to the second heat source assembly of the thermal management system.

In certain exemplary aspects providing the thermal transfer fluid through the shared assembly of the thermal management system and to the second heat source assembly of the thermal management system includes actuating a valve positioned at an upstream junction of the shared assembly or at a downstream junction of the shared assembly to divert the flow of thermal transfer fluid.

In certain exemplary aspects the method further includes increasing a pressure, a flow rate, or both of the thermal transfer fluid through the shared assembly using a thermal fluid pump of the shared assembly in fluid communication with a thermal fluid line of the shared assembly.

In certain exemplary aspects sensing data indicative of the gas turbine engine parameter includes sensing data indicative of an operating condition of the gas turbine engine.

In certain exemplary aspects the first heat source assembly includes a heat source heat exchanger thermally coupled to a cooled cooling air system of the gas turbine engine, and wherein the second heat source assembly includes a waste heat recovery heat source exchanger thermally coupled to a turbine section of the gas turbine engine, an exhaust section of the gas turbine engine, or both.

In certain exemplary aspects providing the thermal transfer fluid through the shared assembly of the thermal management system and to the first heat source assembly of the thermal management system includes preventing a flow of thermal transfer fluid through the second heat source assembly, and wherein providing the thermal transfer fluid through the shared assembly of the thermal management system and to the second heat source assembly of the thermal management system includes preventing a flow of thermal transfer fluid through the first heat source assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
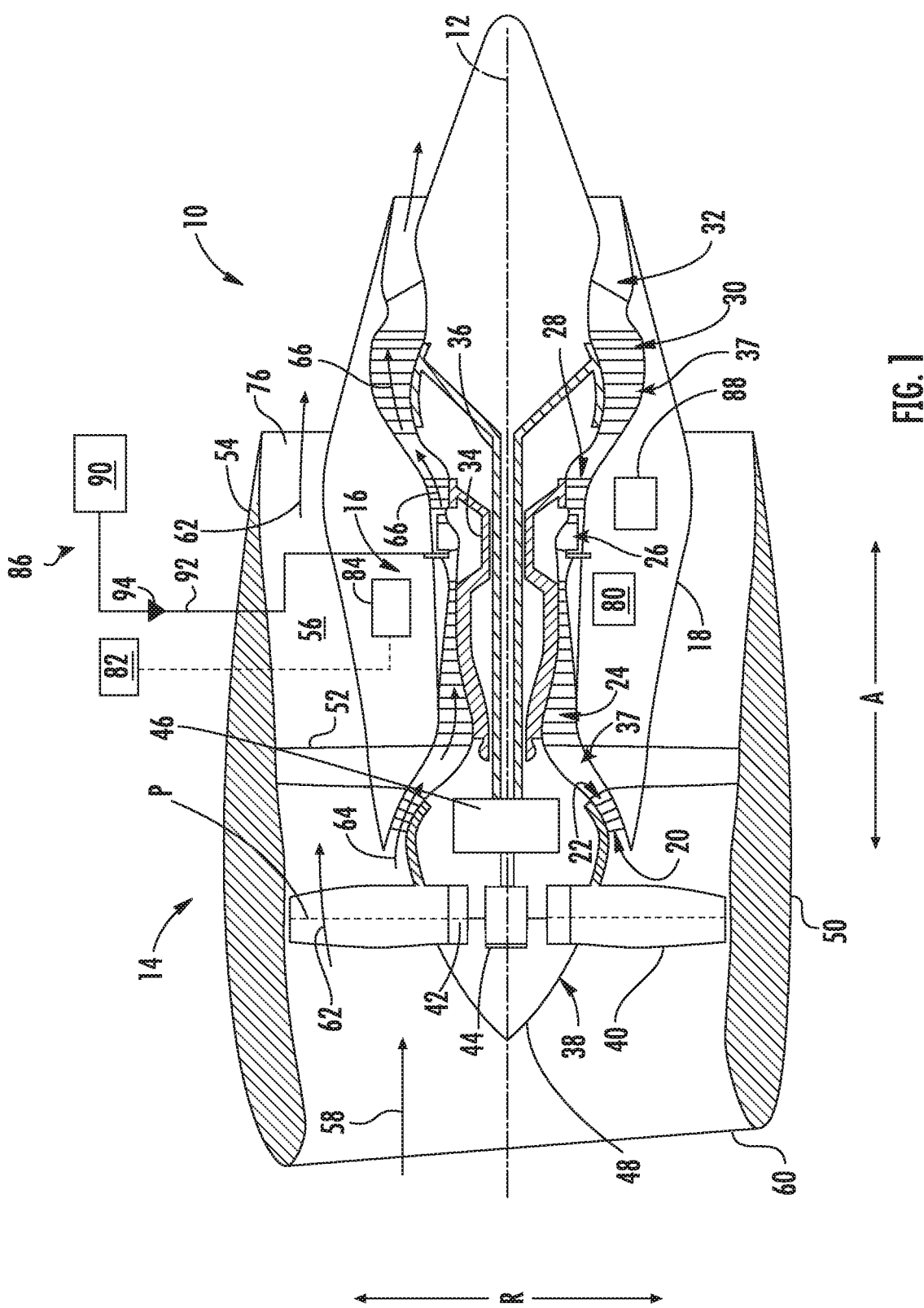
FIG. 1 is a schematic, cross-sectional view of an exemplary gas turbine engine according to various embodiments of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic, cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially-spaced outlet guide vanes 52. Moreover, a downstream end 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio.

The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust.

Further, the exemplary turbofan engine 10 includes a controller 82 operably connected at least to one or more engine sensors 84. The one or more engine sensors 84 may be configured to sense data indicative of parameters of the turbofan engine 10 (the term "parameter" with respect to such turbofan engine 10 broadly referring to, e.g., one or more of a compressor exit pressure and/or temperature, a turbine inlet temperature, a rotational speed of the high speed components/HP shaft 34, a rotational speed of the low pressure components/LP shaft 36, etc., as well as a flight schedule parameter, such as throttle position, altitude, flight phase, etc.). The controller 82 may also be configured to receive data, such as command data, from one or more users or operators of the turbofan engine 10 (such as a pilot). Based on this data received indicative of the parameters, either by the users or operators, or by the one or more sensors 84, the controller 82 may be configured to determine various gas turbine engine operating parameters, and/or an operating condition of the turbofan engine 10, such as a climb operating condition, a cruise operating condition, an idle operating condition, etc. The controller 82 may be configured in the same manner as the exemplary control system/controller 108 described below with reference to FIG. 2.

Moreover, it will be appreciated that the exemplary turbofan engine 10 further includes various accessory systems to aid in the operation of the turbofan engine 10 and/or an aircraft including the turbofan engine 10. For example, the exemplary turbofan engine 10 further includes a cooled cooling air (CCA) system 80 (sometimes also referred to as a "compressor cooling air system") for cooling air from one or both of the HP compressor 24 or LP compressor 22, and providing such cooled air to one or both of the HP turbine 28 or LP turbine 30, or alternatively to an aft portion of the HP compressor 24. For example, the cooled cooling air system 80 may include a cooling duct and a heat exchanger for providing such functionality (see, e.g., FIG. 3, below).

In addition, the exemplary turbofan engine 10 depicted in FIG. 1 includes a fuel delivery system 86 for providing a fuel flow to the combustion section 26 of the turbomachine 16 and a lubrication oil system 88. For the embodiment shown, the fuel delivery system 86 generally includes a fuel tank 90, one or more fuel lines 92 extending from the fuel tank 90 to the combustion section 26, and a fuel pump 94 positioned in flow communication with the one or more fuel lines 92 for increasing a pressure and/or flow rate of the fuel flow therethrough. Further, it will be appreciated that the lubrication oil system 88 of the exemplary turbofan engine 10 may be configured in a similar manner to known systems, whereby the lubrication oil system 88 provides a lubrication oil to one or more bearings of the turbofan engine 10, lubricating such bearings, and reducing a temperature of such bearings. For example, the lubrication oil system 88 may include one or more pumps, tanks, etc., labeled generally as numeral 89, to facilitate such functionality.

Prior turbofan engines 10 and/or aircraft have included individual heat exchangers for each of these accessory systems to remove heat from, e.g., air and/or lubrication in such systems. However, aspects of the present disclosure may include a thermal management system 100 (see FIG. 2) for transferring heat from such accessory systems selectively based, e.g., on an engine parameter or engine operating condition, to more efficiently remove such heat and/or utilize such heat and more efficiently utilize the components included (e.g., the heat sink heat exchangers). In such a manner, as will be explained further below, the turbofan engines 10 may operate these components of the thermal management system 100 on an "as needed" basis and may not require redundant components for doing so.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the turbofan engine 10 may include any suitable number of compressors, turbines (such as an intermediate turbine in addition to an LP and HP turbine), shafts/spools (e.g., two spools, three spools), etc. Further, in certain exemplary embodiments, aspects of the present disclosure may further apply to any other suitable aeronautical gas turbine engine, such as a turbojet engine, turboshaft engine, turboprop engine, etc., whether operated as a subsonic gas turbine engine (i.e., configured to operate mainly at subsonic flight speeds) or as a supersonic gas turbine engine (i.e., configured to operate mainly at supersonic flight speeds). Additionally, in still other exemplary embodiments, the exemplary turbofan engine 10 may include or be operably connected to any other suitable accessory systems. Additionally, or alternatively, the exemplary turbofan engine 10 may not include or be operably connected to one or more of the accessory systems discussed above.

Figure 2:
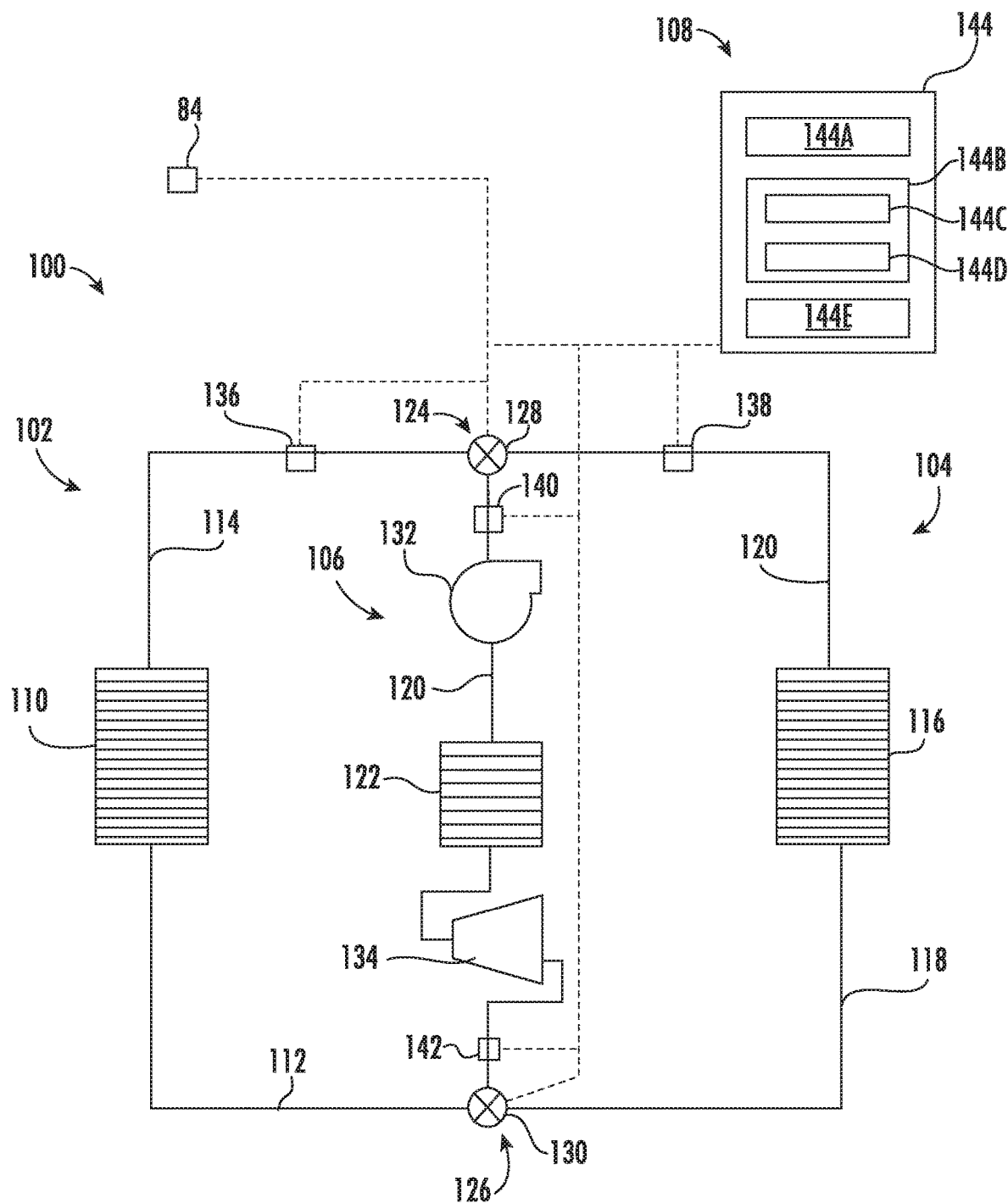
FIG. 2 is a simplified schematic view of a thermal management system in accordance with an exemplary embodiment of the present disclosure.

Referring now to FIG. 2, a schematic diagram is provided of a thermal management system 100 in accordance with an exemplary embodiment of the present disclosure for incorporation at least partially into a gas turbine engine, such as the exemplary turbofan engine 10 of FIG. 1. More specifically, although depicted in isolation from a gas turbine engine in FIG. 2, it will be appreciated that the exemplary thermal management system 100 is operable with at least one of a compressor section, a combustion section (such as combustion section 26 of FIG. 1), a turbine section, or an exhaust section (such as exhaust section 32 of FIG. 1) of the gas turbine engine within which it is installed (see also, e.g., FIG. 3).

As shown, the thermal management system 100 generally includes a first heat source assembly 102, a second heat source assembly 104, a shared assembly 106 and a controller 108. Each of these aspects is described in greater detail below.

For the embodiment shown, the first heat source assembly 102 includes a first heat source exchanger 110, a first thermal fluid inlet line 112 extending to the first heat source exchanger 110, and a first thermal fluid outlet line 114 extending from the first heat source exchanger 110. In such a manner, when a thermal fluid flow is directed to the first heat source assembly 102, such thermal fluid flow may be received through the first thermal fluid inlet line 112, provided to the first heat source exchanger 110 from the first of thermal fluid inlet line 112, and subsequently provided to the first thermal fluid outlet line 114 from the first heat source exchanger 110.

Similarly for the embodiment shown, the second heat source assembly 104 includes a second heat source exchanger 116, a second thermal fluid inlet line 118 extending to the second heat source exchanger 116, and a second thermal fluid outlet line 120 extending from the second heat source exchanger 116. In such a manner, when a thermal fluid flow is directed to the second heat source assembly 104, such thermal fluid flow may be received through the second thermal fluid inlet line 118, provided to the second heat source exchanger 116 from the second of thermal fluid inlet line 118, and subsequently provided to the second thermal fluid outlet line 120 from the second heat source exchanger 116.

As will be discussed below, e.g., with reference to FIGS. 3 and 4, the first heat source exchanger 110 and second heat source exchanger 116 may each be thermally coupled to one or more components of the gas turbine engine with which the thermal management system 100 is installed. For example, referring briefly back to FIG. 1, in at least certain exemplary embodiments the first heat source exchanger 110 and/or the second heat source exchanger 116 may be configured as a waste heat recovery heat source exchanger (such as an exhaust waste heat recovery heat source exchanger in thermal communication with a turbine section, an exhaust section 32, or both, or alternatively as an under-cowl waste heat recovery heat source exchanger in thermal communication with an area underneath a cowling 18 of the turbomachine 16 and radially outward of a core air flowpath 37 of the turbomachine 16), a lubrication oil heat source exchanger (e.g., in thermal communication with a lubrication oil system 88), a cooled cooling air heat source exchanger (e.g., in thermal communication with a cooled cooling air system 80), etc.

Referring still to FIG. 2, the shared assembly 106 of the exemplary thermal management system 100 includes a thermal fluid line 120 and a heat sink exchanger 122 thermally coupled to the thermal fluid line 120. The heat sink exchanger 122 of the shared assembly 106 of the thermal management system 100 may be thermally coupled to any suitable heat sink of the gas turbine engine. For example, referring again briefly back to FIG. 1, and as will be described in greater detail below with reference to, e.g., FIGS. 3 and 4, in at least certain exemplary aspects the heat sink exchanger 122 of the shared assembly 106 may be configured as a fuel heat sink exchanger (e.g., in thermal communication with a fuel delivery system 86), a bypass passage heat sink exchanger (e.g., in thermal communication with an airflow through a bypass passage 56), a compressor discharge heat sink exchanger (e.g., in thermal communication with a downstream section of a compressor section), a ram air heat sink exchanger (e.g., in thermal communication with a ram airflow of the aircraft or gas turbine engine, such as in a military aircraft or engine), or a free stream heat sink exchanger (such as of a three stream gas turbine engine typically found in military applications), etc.

Additionally, in certain exemplary embodiments, the shared assembly 106 may include a plurality of heat sink exchangers 122 arranged in series, parallel, or a combination thereof. With such a configuration, e.g., wherein the shared assembly 106 includes a plurality of heat sink exchangers 122, the system 100 may further be configured to bypass one or more of the heat sink exchangers 122 based on an operating condition of the aircraft or engine. For example, the system 100 may bypass a fan stream heat sink exchanger during high fuel flow rate conditions (e.g., takeoff or climb conditions) such that a fuel heat sink exchanger receives a majority of the heat, and further at relatively low fuel flow rate conditions (e.g., descent or idle conditions) may either bypass the fuel heat sink exchanger or may utilize the fuel heat sink exchanger and the fan stream heat sink exchanger (or other secondary heat sink exchanger).

Further, referring to FIG. 2, the exemplary thermal fluid line 120 generally extends between, and defines at least in part, an upstream junction 124 and a downstream junction 126. The upstream junction 124, or rather, the thermal fluid line 120 of the shared assembly 106 at the upstream junction 124, is in fluid communication with the first thermal fluid outlet line 114 and the second thermal fluid outlet line 120. Further, the downstream junction 126, or rather, the thermal fluid line 120 of the shared assembly 106 at the downstream junction 126, is in fluid communication with the first thermal fluid inlet line 112 and the second thermal fluid inlet line 118. In such a manner, it will be appreciated that during operation, a thermal fluid flow may be provided to the thermal fluid line 120 of the shared assembly 106 at the upstream junction 124 from the first thermal fluid outlet line 114, the second thermal fluid outline, or both. Similarly, the thermal fluid flow through thermal fluid line 120 of the shared assembly 106 may be provided to the first thermal fluid inlet line 112, the second thermal fluid inlet line 118, or both, at the downstream junction 126.

More specifically, for the embodiment shown, the thermal management system 100 includes a valve positioned at the upstream junction 124 of the shared assembly 106 or at the downstream junction 126 of the shared assembly 106. As will be explained in greater detail below, the controller 108 is operably coupled to the valve for selectively fluidly connecting the first heat source assembly 102 or the second heat source assembly 104 to the shared assembly 106. More specifically, still, for the embodiment shown the thermal management system 100 includes a first valve 128 positioned at the upstream junction 124 and a second valve 130 positioned at the downstream junction 126. In such a manner, it will be appreciated that the first valve 128 is fluidly coupled to the first thermal fluid outlet line 114 (at a first inlet), the second thermal fluid outlet line 120 (at a second inlet), and the thermal fluid line 120 of the shared assembly 106 (at an outlet); and the second valve 130 is fluidly coupled to the thermal fluid line 120 of the shared assembly 106 (at an inlet), the first thermal fluid inlet line 112 (at a first outlet), and the second thermal fluid inlet line 118 (at a second outlet).

Each of the first valve 128 and the second valve 130 is, for the embodiment shown, operably coupled to the controller 108, such that the controller 108 may actuate the first valve 128, the second valve 130, or both, to selectively fluidly connect the first heat source assembly 102 or the second heat source assembly 104 to the shared assembly 106. In such a manner, it will be appreciated that the first valve 128, the second valve 130, or both, may be variable throughput valves capable of varying a fluid flow, e.g., from two inputs to a single output (e.g., the first valve 128), or from a single input between two outputs (e.g., the second valve 130). In certain exemplary embodiments the first valve 128 or the second valve 130 may be configured to vary a thermal fluid flow between two inlets (e.g., first valve 128) or two outlets (e.g., second valve 130) at a ratio of 1:0 (i.e., 100% through a first inlet/outlet and 0% through a second inlet/outlet) and 0:1. Additionally, or alternatively, the first valve 128 or the second valve 130 may be configured to vary the ratio of thermal fluid flow to one or more intermediate positions.

Referring back to the other operations and features of the thermal management system 100 and referring still to FIG. 2, it will be appreciated that for the embodiment shown, thermal management system 100 is configured to operate in a loop consisting essentially of the first heat source assembly 102 and the shared assembly 106, or alternatively in a loop consisting essentially of the second heat source assembly 104 and the shared assembly 106. In such a manner, the thermal management system 100 may not be configured to fully operate the first heat source assembly 102 and second heat source assembly 104 simultaneously. More specifically, for the embodiment shown, the first heat source assembly 102 defines a first maximum thermal fluid throughput, the second heat source assembly 104 defines a second maximum thermal fluid throughput, and the shared assembly 106 defines a third maximum thermal fluid throughput. The first maximum thermal fluid throughput may be set by a diameter of the first thermal fluid inlet line 112, a diameter of the first thermal fluid outlet line 114, one or more flow characteristics of the first heat source exchanger 110, or a combination thereof. Similarly, the second maximum thermal fluid throughput may be set by a diameter of the second thermal fluid inlet line 118, a diameter of the second thermal fluid outlet line 120, one or more flow characteristics of the second heat source exchanger 110, or a combination thereof. Further, the third maximum thermal fluid throughput may be set by a diameter of the thermal fluid line 120, one or more flow characteristics of the heat sink exchanger 122, or a combination thereof.

For the embodiment depicted, the first maximum thermal fluid throughput is substantially equal to the second maximum thermal fluid throughput, and the second maximum thermal fluid throughput is substantially equal to the third maximum thermal fluid throughput. In such a manner, the shared assembly 106 of the thermal management system 100 may be configured to operate fully with the first heat source assembly 102, or alternatively fully with the second heat source assembly 104, but not fully with the first heat source assembly 102 and the second heat source assembly 104.

Moreover, it will further be appreciated that for the embodiment depicted in FIG. 2, the shared assembly 106 further includes a thermal fluid pump 132 and a turbine 134. The thermal fluid pump 132 is configured to provide a flow of thermal fluid through the first heat source assembly 102 and the shared assembly 106 when the shared assembly 106 is fluidly coupled to the first heat source assembly 102 (by the controller 108, as will be explained below). Similarly, the thermal fluid pump 132 is configured to provide a flow of thermal fluid through the second heat source assembly 104 and the shared assembly 106 when the shared assembly 106 is fluidly coupled to the second heat source assembly 104 (again by the controller 108, as will be explained below).

More specifically, still, for the embodiment shown the thermal management system 100 is configured to utilize a supercritical thermal transfer fluid, and the thermal fluid pump 132 of the shared assembly 106 is a supercritical thermal fluid pump. For example, the thermal management system 100 may utilize a supercritical CO2, or other supercritical thermal fluid. Utilization of a supercritical thermal fluid my allow for more efficient heat transfer with the thermal management system 100. Further, since the thermal management system 100 utilizes shared assets (i.e., the shared assembly 106) between the first and second heat source assemblies 102, 104, the thermal management system 100 may more fully utilize the more efficient heat transfer features throughout an entire flight envelope.

Alternatively, however, in other embodiments, the thermal management system 100 utilize any other suitable thermal transfer fluid. For example, in other embodiments, the thermal management system 100 may utilize a single phase thermal transfer fluid (configured to remain substantially in e.g., a liquid phase throughout operations), a phase change thermal transfer fluid, etc. For example, the thermal transfer fluid may be an oil, refrigerant, etc.

Further, as noted above, the exemplary shared assembly 106 includes a turbine 134. The turbine 134 may be configured to extract energy from the thermal transfer fluid flow through the shared assembly 106, and more specifically, through the thermal fluid line 120 of the shared assembly 106. In certain exemplary embodiments, the turbine 134 may expand the thermal transfer fluid through such extraction of energy/rotational energy therefrom, and transfer such energy to, e.g., an electric machine to generate electrical power. Additionally, or alternatively, the turbine 134 may in other embodiments be mechanically coupled to the thermal fluid pump 132, such that the pump 132 is configured as a turbopump.

Notably, it will be appreciated that for the embodiment shown, the thermal fluid pump 132 is positioned upstream of the heat sink exchanger 122, and the heat sink exchanger 122 is positioned upstream of the turbine 134, all within the shared assembly 106, and more particularly, along the thermal fluid line 120 of the shared assembly 106. In such a manner, it will be appreciated that the thermal fluid pump 132 may increase a pressure, a flowrate, and/or a temperature of the thermal transfer fluid, allowing for increased thermal transfer from the thermal fluid through the heat sink exchanger 122 to a particular heat sink. Further, the turbine 134 being positioned downstream of the heat sink exchanger 122 may further reduce the temperature of the thermal transfer fluid through the shared assembly 106, prior to such thermal transfer fluid being utilized to accept heat from the first heat source assembly 102, the second heat source assembly 104, or both. Such may further increase an efficiency of the thermal management system 100.

It should be appreciated, however, that in other exemplary embodiments, the thermal management system 100 may be configured in any other suitable manner. For example, in other embodiments, the pump 132, heat sink exchanger 122, and turbine 134 may be arranged in any other suitable flow order. Further, in other embodiments the shared assembly 106 may not include each of the features depicted, such as the turbine 134, one of the valves 128, 130, etc.

Referring still to FIG. 2, as briefly noted above, the gas turbine engine, the thermal management system 100, or both, further includes a plurality of sensors operably coupled to the controller 108. The one or more sensors may include one or more gas turbine engine sensors 84 configured to sense data indicative of, e.g., operating conditions and/or operating parameters of the gas turbine engine, as well as one or more thermal management system sensors. Specifically, for the embodiment shown, the thermal management system 100 includes a first sensor 136 operable with the first heat source assembly 102, a second sensor 138 operable with the second heat source assembly 104, and a third sensor 140 and a fourth sensor 142 operable with the shared assembly 106. The first sensor 136 may sense data indicative of a flow rate, a pressure, and/or a temperature of a thermal fluid flow through the first heat source assembly 102; the second sensor 138 may similarly sense data indicative of a flow rate, a pressure, and/or a temperature of a thermal fluid flow through the second heat source assembly 104; and the third sensor 140 and fourth sensor 142 may sense data indicative of a flow rate, a pressure, and/or a temperature of a thermal fluid flow through the shared assembly 106.

As noted, the exemplary controller 108 depicted in FIG. 2 is configured to receive the data sensed from the one or more sensors (sensors 84, 136, 138, 140, 142 for the embodiment shown) and, e.g., may make control decisions for the thermal management system 100 based on the received data.

In one or more exemplary embodiments, the controller 108 depicted in FIG. 2 may be a stand-alone controller 108 for the thermal management system 100, or alternatively, may be integrated into one or more of a controller for the gas turbine engine with which the thermal management system 100 is integrated, a controller for an aircraft including the gas turbine engine with which the thermal management system 100 is integrated, etc.

Referring particularly to the operation of the controller 108, in at least certain embodiments, the controller 108 can include one or more computing device(s) 144. The computing device(s) 144 can include one or more processor(s) 144A and one or more memory device(s) 144B. The one or more processor(s) 144A can include any suitable processing device, such as a microprocessor, microcontroller, integrated circuit, logic device, and/or other suitable processing device. The one or more memory device(s) 144B can include one or more computer-readable media, including, but not limited to, non-transitory computer-readable media, RAM, ROM, hard drives, flash drives, and/or other memory devices.

The one or more memory device(s) 144B can store information accessible by the one or more processor(s) 144A, including computer-readable instructions 144C that can be executed by the one or more processor(s) 144A. The instructions 144C can be any set of instructions that when executed by the one or more processor(s) 144A, cause the one or more processor(s) 144A to perform operations. In some embodiments, the instructions 144C can be executed by the one or more processor(s) 144A to cause the one or more processor(s) 144A to perform operations, such as any of the operations and functions for which the controller 108 and/or the computing device(s) 144 are configured, the operations for operating a thermal management system 100 (e.g, method 200), as described herein, and/or any other operations or functions of the one or more computing device(s) 144. The instructions 144C can be software written in any suitable programming language or can be implemented in hardware. Additionally, and/or alternatively, the instructions 144C can be executed in logically and/or virtually separate threads on processor(s) 144A. The memory device(s) 144B can further store data 144D that can be accessed by the processor(s) 144A. For example, the data 144D can include data indicative of power flows, data indicative of engine/aircraft operating conditions, and/or any other data and/or information described herein.

The computing device(s) 144 can also include a network interface 144E used to communicate, for example, with the other components of the thermal management system 100, the gas turbine engine incorporating thermal management system 100, the aircraft incorporating the gas turbine engine, etc. For example, in the embodiment depicted, as noted above, the gas turbine engine and/or thermal management system 100 includes one or more sensors for sensing data indicative of one or more parameters of the gas turbine engine, the thermal management system 100, or both. The controller 108 the thermal management system 100 is operably coupled to the one or more sensors through, e.g., the network interface, such that the controller 108 may receive data indicative of various operating parameters sensed by the one or more sensors during operation. Further, for the embodiment shown the controller 108 is operably coupled to, e.g., the first valve 128 and the second valve 130. In such a manner, the controller 108 may be configured to selectively fluidly connect the first heat source assembly 102 or the second heat source assembly 104 to the shared assembly 106 (i.e., through actuation of the first valve 128, the second valve 130, or both) in response to, e.g., the data sensed by the one or more sensors.

The network interface 144E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 3:
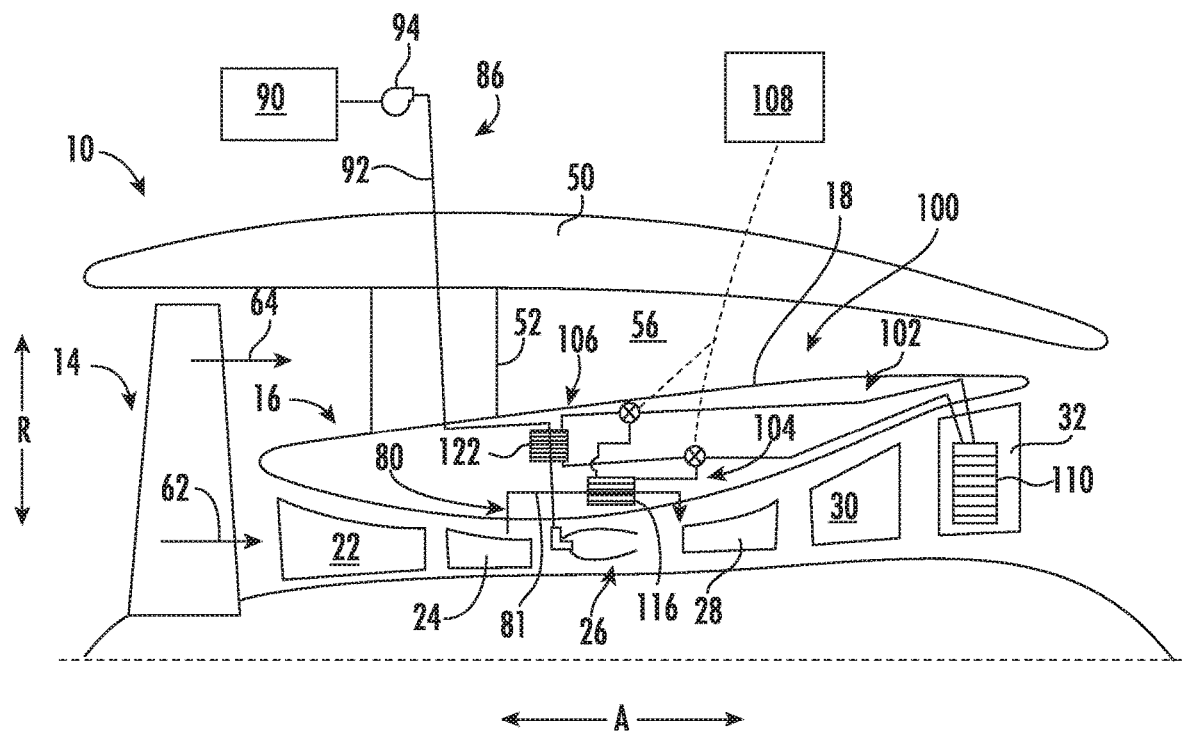
FIG. 3 is a schematic view of a gas turbine engine in accordance with another exemplary embodiment of the present disclosure including a thermal management system in accordance with an exemplary embodiment of the present disclosure.
Figure 4:
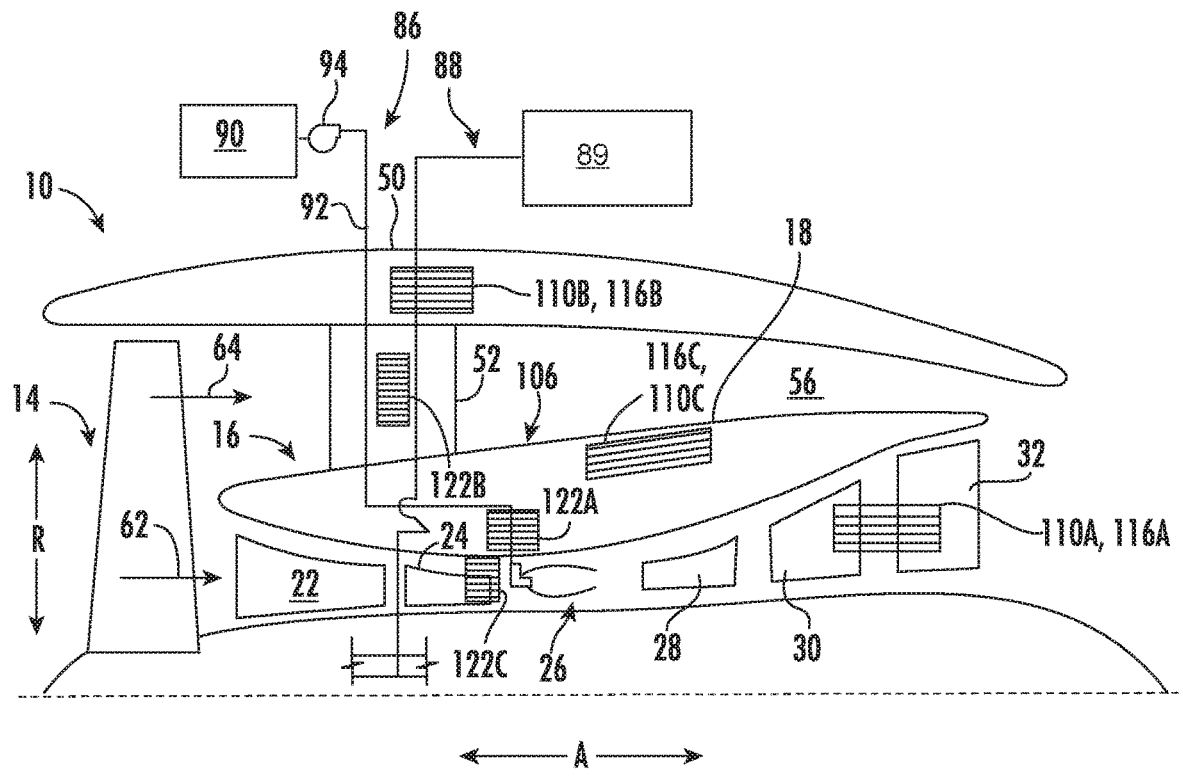
FIG. 4 is a schematic view of a gas turbine engine in accordance with yet another exemplary embodiment of the present disclosure depicting alternative exemplary aspects of a thermal management system in accordance with various embodiments of the present disclosure.

Referring now to FIG. 3, a simplified, schematic view of a gas turbine engine 10 including a thermal management system 100 in accordance with an exemplary aspect of the present disclosure is depicted. The exemplary thermal management system 100 of FIG. 3 may be configured in substantially the same manner as the exemplary thermal management system 100 of FIG. 2, and the exemplary gas turbine 10 depicted in FIG. 3 may be configured in substantially the same manner as the exemplary turbofan engine 10 described above with reference to FIG. 1, or in accordance with any other suitable gas turbine engine (e.g., a turbofan engine having any other suitable configuration, a turboshaft engine, a turboprop engine, a turbojet engine, etc.).

The exemplary gas turbine engine 10 of FIG. 3 generally includes a fan section 14 and a turbomachine 16. The turbomachine 16 includes in serial flow order a compressor section having an LP compressor 22 and an HP compressor 24, a combustion section 26, a turbine section including an HP turbine 28 and an LP turbine 30, and an exhaust section 32. Moreover, the turbomachine 16 and fan section 14 are at least partially surrounded by an outer nacelle 50, with the turbomachine 16 supported relative to the outer nacelle 50 through a plurality of outlet guide vanes 52. The outer nacelle 50 defines a bypass airflow passage 56 with the turbomachine 16. A first portion 62 of an airflow from the fan section 14 is provided through the turbomachine 16 as a core airflow, and a second 64 portion of the airflow from the fan section 14 is provided through the bypass airflow passage 56 as a bypass airflow.

In addition, the gas turbine engine 10 includes a cooled cooling air system 80 (sometimes also referred to as a "compressor cooling air system") for providing air from one or both of the HP compressor 24 or LP compressor 22, cooling such air, and providing such air to one or both of the HP turbine 28 or LP turbine 30 during operation of the gas turbine engine 10 (or alternatively to an aft portion of the HP compressor 24). The cooling air system 80 includes one or more cooling passages 81 for ducting air from the compressor section to the turbine section, such that the cooling air system 80 may cool one or more components of the turbine section.

Further, the thermal management system 100 generally includes a first heat source assembly 102, a second heat source assembly 104, a shared assembly 106, and a controller 108. As discussed in greater detail above with reference to FIG. 2, the first heat source assembly 102 generally includes a first heat source exchanger 110, a first thermal fluid inlet line 112 (not labeled for clarity), and a first thermal fluid outlet line 114 (not labeled for clarity). Additionally, the second heat source assembly 104 similarly includes a second heat source exchanger 116, a second thermal fluid inlet line 118 (not labeled for clarity), and a second thermal fluid outlet line (not labeled for clarity). Further, the shared assembly 106 generally includes a thermal fluid line 120 and a heat sink exchanger 122 thermally coupled to the thermal fluid line 120.

For the embodiment shown, the first heat source exchanger 110 of the first heat source assembly 102 is at least one of a cooled cooling air heat source exchanger (i.e., thermally coupled to, e.g., the one or more cooling passages 81 of the cooling air system 80 for cooling an airflow through the one or more cooling passages 81), an exhaust waste heat recovery heat source exchanger (e.g., positioned at an aft end of the turbine section of the gas turbine engine 10, within the exhaust section 32 of the gas turbine engine 10, or both, for extracting heat from an airflow therethrough), a lubrication oil heat source exchanger (e.g., positioned in thermal communication with the lubrication oil system of the gas turbine engine 10 for extracting heat from a flow of lubrication oil therethrough), or an under-cowl waste heat recovery heat source exchanger (e.g., positioned within a cowling 18 of a turbomachine 16 of the gas turbine engine 10 for extracting heat therefrom). More specifically, for the embodiment of FIG. 3, the first heat source exchanger 110 is a cooled cooling air heat source exchanger in thermal communication with the cooled cooling air system 80 and the second heat source exchanger 116 is a waste heat recovery heat source exchanger (or rather, an exhaust waste heat recovery heat source exchanger) in thermal communication with the turbine section, the exhaust section 32, or both.

Further, for the embodiment shown the heat sink exchanger 122 of the shared assembly 106 is at least one of a fuel heat sink exchanger (e.g., a heat exchanger thermally coupled to the fuel delivery system for transferring heat to a fuel flow through the fuel delivery system), a bypass passage heat sink exchanger (e.g., a heat exchanger positioned within, or thermally coupled to, the bypass passage 56 of the gas turbine engine 10 for transferring heat to a bypass airflow through the bypass passage 56), or a compressor discharge heat sink exchanger (i.e., a heat exchanger positioned at a downstream end of the compressor section and upstream of the combustion section 26 for transferring heat to the airflow through, or from, the downstream end of the compressor section of the gas turbine engine 10). More specifically, for the embodiment shown, the heat sink exchanger 122 is a fuel heat sink exchanger.

Moreover, as discussed above, the controller 108 is configured to selectively fluidly connect the first heat source assembly 102 or the second heat source assembly 104 to the shared assembly 106. In such a manner, the controller 108 may operate the thermal management system 100 such that the thermal management system 100 more efficiently utilizes its assets throughout a flight envelope. For example, during a first operating condition (e.g., cruise, decent, or some other mid- to low-power operating mode), the controller 108 of the thermal management system 100 may fluidly connect the first heat source assembly 102 with the shared assembly 106, such that substantially all of a flow of thermal transfer fluid through the shared assembly 106 is provided to and circulated through the first heat source assembly 102. In such a manner, the thermal management system 100 may effectively recapture waste heat through the exhaust section 32 of the gas turbine engine 10 and utilize that heat to create a more efficient combustion process by heating a fuel flow to the combustion section 26. Subsequently, during a second operating condition (e.g., takeoff, climb, or some other high-power operating mode), the controller 108 of the thermal management system 100 may fluidly connect the second heat source assembly 104 with the shared assembly 106, such that substantially all of a flow of thermal transfer fluid through the shared assembly 106 is provided to and circulated through the second heat source assembly 104. In such a manner, the thermal management system 100 may effectively reduce a temperature of an airflow through the cooled cooling air system 80 of the gas turbine engine, to allow increased temperatures within the turbine section and consequently, higher power outlets of the gas turbine engine.

Notably, during the first operating mode, the cooled cooling air system 80 may not need the additional heat rejection to allow the additional power output of the engine 10. Similarly, during the second operating mode, it may not be necessary (or it may at least be less important) to capture waste heat from the exhaust section 32 for short-term efficiency benefits. Accordingly, by utilizing the shared assembly 104, which may be selectively fluidly connected to the first heat source assembly 102 and second heat source assembly 104, the thermal management system 100 may operate with less non-utilized components throughout the entire flight envelope of the engine 10, providing a lighter, more efficient, and more cost effective engine.

It will be appreciated, however, that in other embodiments, the gas turbine engine 10, the thermal management system 100, or both may have any other suitable configuration. For example, referring now to FIG. 4, it will be appreciated that in other embodiments, the first heat source exchanger 110 of the first heat source assembly 102 may be any other suitable heat source exchanger, the second heat source exchanger 116 of the second heat source assembly 104 may be any other suitable source exchanger, and further the heat sink exchanger 122 of the shared assembly 106 may be any other suitable heat sink exchanger. For example, for the embodiment depicted in FIG. 4, the first heat source exchanger 110 and/or the second heat source exchanger 116 may be configured as an exhaust waste heat recovery heat exchanger 110A/116A, a lubrication oil heat source exchanger 110B/116B (operable with a lubrication oil system of the gas turbine engine 10), an under-cowl waste heat recovery heat source exchanger 110C/116C, etc. Similarly, for the embodiment of FIG. 4, the heat sink exchanger 122 may be, e.g., a fuel heat sink exchanger 122A (operable with a fuel delivery system 86 of the gas turbine engine 10), a bypass passage heat sink exchanger 122B (e.g., coupled to, or integrated into, an outlet guide vane 52), a compressor discharge heat sink exchanger 122C, etc. Other configurations are contemplated as well. Moreover, in still other embodiments, the heat source exchanger 110 may be an intercooler heat source exchanger positioned within or upstream of the compressor section, such as upstream of the HP compressor 24, or upstream of the LP compressor 22.

Figure 5:
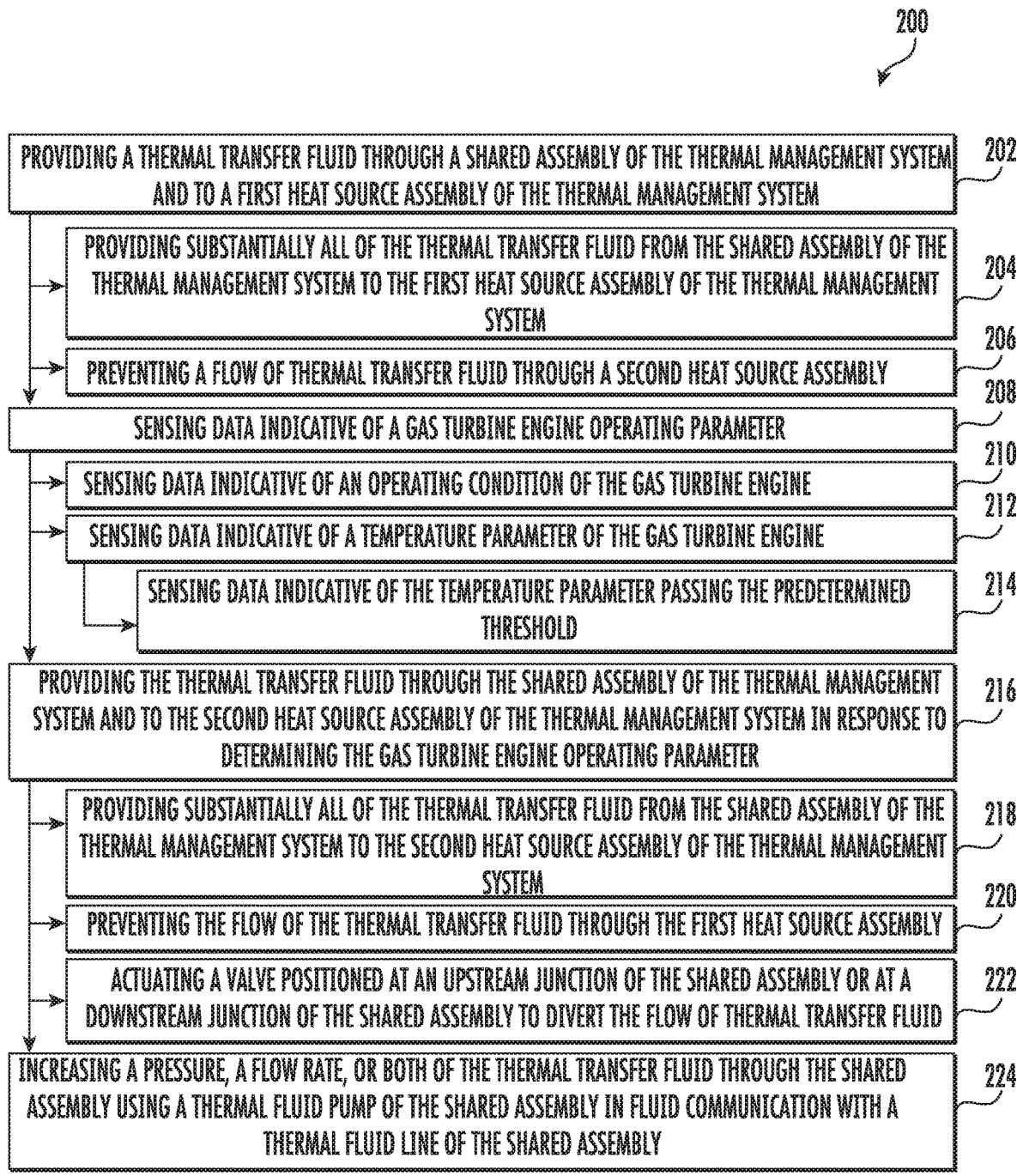
FIG. 5 is a flow diagram of a method of operating a thermal management system for a gas turbine engine in accordance with an exemplary aspect of the present disclosure.

Referring now to FIG. 5, a flow diagram of a method 200 for operating a thermal management system of a gas turbine engine is provided. In at least certain exemplary aspects, the method 200 may be utilized to operate one or more of the exemplary thermal management systems 100 described above with reference to FIGS. 1 through 4. However, in other exemplary aspects, the method 200 may be utilized to operate any other suitable thermal management system.

The method 200 generally includes at (202) providing a thermal transfer fluid through a shared assembly of the thermal management system and to a first heat source assembly of the thermal management system. The shared assembly includes a heat sink exchanger. Notably, for the exemplary aspect depicted in FIG. 5, providing the thermal transfer fluid through the shared assembly of the thermal management system and to the first heat source assembly of the thermal management system at (202) includes at (204) providing substantially all of the thermal transfer fluid from the shared assembly of the thermal management system to the first heat source assembly of the thermal management system. More specifically, for the exemplary aspect depicted in FIG. 5, providing the thermal transfer fluid through the shared assembly of the thermal management system and to the first heat source assembly of the thermal management system at (202) includes at (206) preventing a flow of thermal transfer fluid through a second heat source assembly.

The method 200 further includes at (208) sensing data indicative of a gas turbine engine operating parameter. In certain exemplary aspects, sensing data indicative of the gas turbine engine operating parameter at (208) includes at (210) sensing data indicative of an operating condition of the gas turbine engine. The operating condition of the gas turbine engine may be, e.g., an operating mode of the gas turbine engine or aircraft including the gas turbine engine, such as a takeoff operating mode, a climb operating mode, a cruise operating mode, a step climb operating mode, a descent operating mode, a taxiing operating mode, a throttle position, etc. Additionally, or alternatively, in certain exemplary aspects, such as the exemplary aspect depicted in FIG. 5, sensing data indicative of the gas turbine engine operating parameter at (208) includes at (212) sensing data indicative of a temperature parameter of the gas turbine engine. More specifically, for the exemplary aspect depicted, sensing data indicative of the temperature parameter the gas turbine engine at (212) includes at (214) sensing data indicative of the temperature parameter passing the predetermined threshold. For example, sensing data indicative of the temperature parameter passing a predetermined threshold may include sensing data indicative of the temperature parameter surpassing a predetermined threshold or falling below a predetermined threshold. By way of example only, in certain exemplary aspects, sensing data indicative of the temperature parameter passing a predetermined threshold may include sensing data indicative of, e.g., a compressor exit temperature increasing above a predetermined threshold, an exhaust temperature increasing above a predetermined threshold, one or both of the compressor exit temperature or exhaust temperature decreasing below a predetermined threshold, etc.

Notably, in one or more of the above exemplary aspects, sensing data indicative of a gas turbine engine operating parameter at (208) may include receiving data from one or more sensors within the gas turbine engine or otherwise operable with the gas turbine engine.

Referring still to the exemplary method 200 depicted in FIG. 5, the method 200 further includes at (216) providing the thermal transfer fluid through the shared assembly of the thermal management system and to the second heat source assembly of the thermal management system in response to sensing data indicative of the gas turbine engine operating parameter at (208). For the exemplary aspect depicted, providing the thermal transfer fluid through the shared assembly of the thermal management system and to the second heat source assembly of thermal management system at (216) includes at (218) providing substantially all of the thermal transfer fluid from the shared assembly of the thermal management system to the second heat source assembly of the thermal management system. More specifically, for the exemplary aspect depicted, providing the thermal transfer fluid through the shared assembly of the thermal management system and to the second heat source assembly of the thermal management system at (216) includes at (220) preventing the flow of thermal transfer fluid through the first heat source assembly.

Further, for the exemplary aspect depicted in FIG. 5, providing the thermal transfer fluid through the shared assembly of the thermal management system and to the second heat source assembly of the thermal management system at (216) includes at (222) actuating a valve positioned at an upstream junction of the shared assembly or at a downstream junction of the shared assembly to divert the flow of thermal transfer fluid. In such a manner, the valve may be actuated in response to the sensed data indicative of the gas turbine engine parameter to fluidly connect the shared assembly with the second heat source assembly as opposed to the first heat source assembly.

Notably, in at least certain exemplary aspects, the first heat source assembly may include a heat source heat exchanger thermally coupled to a cooled cooling air system of the gas turbine engine, and the second heat source assembly may include a waste heat recovery heat source exchanger thermally coupled to a turbine section gas turbine engine, an exhaust section of the gas turbine engine, or both. In such a manner, the method 200 may operate the thermal management system such that the shared assembly operates with the first heat source assembly (including the heat source heat exchanger thermally coupled to the cooled cooling air system) during, e.g., a high power operating mode/conditions of the gas turbine engine such that the gas turbine engine may provide cooler air to the turbine section allowing for higher temperature combustion and greater power generation. By contrast, the method 200 may operate the thermal management system such that the shared assembly operates with the second heat source assembly (including the waste heat recovery heat source exchanger) during, e.g., a cruise operating mode/condition or other relatively low-power operation modes/conditions of the gas turbine engine such that waste heat may be recovered and utilized to increase an efficiency of the gas turbine engine when the high-powered operations (requiring full use of the cooled cooling air systems) are not necessary.

Briefly, referring still to the exemplary method 200 depicted in FIG. 5, the method 200 may additionally include at (224) increasing a pressure, a flow rate, or both of the thermal transfer fluid through the shared assembly using a thermal fluid pump of the shared assembly in fluid communication with a thermal fluid line of the shared assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine comprising:
    a compressor section, a combustion section, a turbine section, and an exhaust section arranged in series flow; and
    a thermal management system operable with at least one of the compressor section, the combustion section, the turbine section, or the exhaust section, the thermal management system comprising:
        a first heat source assembly comprising a first heat source exchanger, a first thermal fluid inlet line extending to the first heat source exchanger, and a first thermal fluid outlet line extending from the first heat source exchanger;
        a second heat source assembly comprising a second heat source exchanger, a second thermal fluid inlet line extending to the second heat source exchanger, and a second thermal fluid outlet line extending from the second heat source exchanger;
        a shared assembly comprising a thermal fluid line and a heat sink exchanger, the shared assembly defining an upstream junction in fluid communication with the first thermal fluid outlet line and second thermal fluid outlet line and a downstream junction in fluid communication with the first thermal fluid inlet line and second thermal fluid inlet line; and
        a controller configured to selectively fluidly connect the first heat source assembly or the second heat source assembly to the shared assembly,
    wherein the heat sink exchanger of the shared assembly is a fuel heat sink exchanger, a bypass passage heat sink exchanger, a compressor discharge heat sink exchanger, a ram air heat sink exchanger, or a free stream heat sink exchanger.

2. The gas turbine engine of claim 1,
    wherein the shared assembly comprises a thermal fluid pump for providing a flow of thermal fluid through the shared assembly and the first heat source assembly when the controller fluidly connects the shared assembly to the first heat source assembly, and through the shared assembly and the second heat source assembly when the controller fluidly connects the shared assembly to the second heat source assembly.

3. The gas turbine engine of claim 1, further comprising:
    one or more sensors for sensing data indicative of one or more parameters of the gas turbine engine,
    wherein the controller of the thermal management system is operably coupled to the one or more sensors, and wherein the controller is configured to selectively fluidly connect the first heat source assembly or the second heat source assembly to the shared assembly in response to the data sensed by the one or more sensors.

4. A gas turbine engine comprising:
a compressor section, a combustion section, a turbine section, and an exhaust section arranged in series flow; and
a thermal management system operable with at least one of the compressor section, the combustion section, the turbine section, or the exhaust section, the thermal management system comprising:
  a first heat source assembly comprising a first heat source exchanger, a first thermal fluid inlet line extending to the first heat source exchanger, and a first thermal fluid outlet line extending from the first heat source exchanger;
  a second heat source assembly comprising a second heat source exchanger, a second thermal fluid inlet line extending to the second heat source exchanger, and a second thermal fluid outlet line extending from the second heat source exchanger;
  a shared assembly comprising a thermal fluid line and a heat sink exchanger, the shared assembly defining an upstream junction in fluid communication with the first thermal fluid outlet line and second thermal fluid outlet line and a downstream junction in fluid communication with the first thermal fluid inlet line and second thermal fluid inlet line; and
  a controller configured to selectively fluidly connect the first heat source assembly or the second heat source assembly to the shared assembly,
wherein the first heat source exchanger is a cooled cooling air heat source exchanger, and
wherein the second heat source exchanger is a waste heat recovery heat source exchanger in thermal communication with the turbine section, the exhaust section, or both.

5. A gas turbine engine comprising:
a compressor section, a combustion section, a turbine section, and an exhaust section arranged in series flow; and
a thermal management system operable with at least one of the compressor section, the combustion section, the turbine section, or the exhaust section, the thermal management system comprising:
  a first heat source assembly comprising a first heat source exchanger, a first thermal fluid inlet line extending to the first heat source exchanger, and a first thermal fluid outlet line extending from the first heat source exchanger;
  a second heat source assembly comprising a second heat source exchanger, a second thermal fluid inlet line extending to the second heat source exchanger, and a second thermal fluid outlet line extending from the second heat source exchanger;
  a shared assembly comprising a thermal fluid line and a heat sink exchanger, the shared assembly defining an upstream junction in fluid communication with the first thermal fluid outlet line and second thermal fluid outlet line and a downstream junction in fluid communication with the first thermal fluid inlet line and second thermal fluid inlet line; and
  a controller configured to selectively fluidly connect the first heat source assembly or the second heat source assembly to the shared assembly,
wherein the thermal management system includes a valve positioned at the upstream junction of the shared assembly or at the downstream junction of the shared assembly, and
wherein the controller is operably coupled to the valve for selectively fluidly connecting the first heat source assembly or the second heat source assembly to the shared assembly.

6. The gas turbine engine of claim 5, wherein the first heat source exchanger is a waste heat recovery heat source exchanger, or a lubrication oil heat source exchanger.

7. A gas turbine engine comprising:
a compressor section, a combustion section, a turbine section, and an exhaust section arranged in series flow; and
a thermal management system operable with at least one of the compressor section, the combustion section, the turbine section, or the exhaust section, the thermal management system comprising:
  a first heat source assembly comprising a first heat source exchanger, a first thermal fluid inlet line extending to the first heat source exchanger, and a first thermal fluid outlet line extending from the first heat source exchanger;
  a second heat source assembly comprising a second heat source exchanger, a second thermal fluid inlet line extending to the second heat source exchanger, and a second thermal fluid outlet line extending from the second heat source exchanger;
  a shared assembly comprising a thermal fluid line and a heat sink exchanger, the shared assembly defining an upstream junction in fluid communication with the first thermal fluid outlet line and second thermal fluid outlet line and a downstream junction in fluid communication with the first thermal fluid inlet line and second thermal fluid inlet line; and
  a controller configured to selectively fluidly connect the first heat source assembly or the second heat source assembly to the shared assembly,
wherein the thermal management system is configured to utilize a supercritical thermal transfer fluid, and
wherein the shared assembly comprises a supercritical thermal fluid pump for providing a flow of supercritical thermal fluid through the shared assembly and the first heat source assembly when the controller fluidly connects the shared assembly to the first heat source assembly, and through the shared assembly and the second heat source assembly when the controller fluidly connects the shared assembly to the second heat source assembly.

8. A gas turbine engine comprising:
a compressor section, a combustion section, a turbine section, and an exhaust section arranged in series flow; and
a thermal management system operable with at least one of the compressor section, the combustion section, the turbine section, or the exhaust section, the thermal management system comprising:
  a first heat source assembly comprising a first heat source exchanger, a first thermal fluid inlet line extending to the first heat source exchanger, and a first thermal fluid outlet line extending from the first heat source exchanger;
  a second heat source assembly comprising a second heat source exchanger, a second thermal fluid inlet line extending to the second heat source exchanger, and a second thermal fluid outlet line extending from the second heat source exchanger;
a shared assembly comprising a thermal fluid line and a heat sink exchanger, the shared assembly defining an upstream junction in fluid communication with the first thermal fluid outlet line and second thermal fluid outlet line and a downstream junction in fluid communication with the first thermal fluid inlet line and second thermal fluid inlet line; and
a controller configured to selectively fluidly connect the first heat source assembly or the second heat source assembly to the shared assembly,
wherein the shared assembly comprises a turbine in flow communication with the thermal fluid line for extracting energy from a thermal fluid flow through the thermal fluid line of the shared assembly.

9. A gas turbine engine comprising:
a compressor section, a combustion section, a turbine section, and an exhaust section arranged in series flow; and
a thermal management system operable with at least one of the compressor section, the combustion section, the turbine section, or the exhaust section, the thermal management system comprising:
a first heat source assembly comprising a first heat source exchanger, a first thermal fluid inlet line extending to the first heat source exchanger, and a first thermal fluid outlet line extending from the first heat source exchanger;
a second heat source assembly comprising a second heat source exchanger, a second thermal fluid inlet line extending to the second heat source exchanger, and a second thermal fluid outlet line extending from the second heat source exchanger;
a shared assembly comprising a thermal fluid line and a heat sink exchanger, the shared assembly defining an upstream junction in fluid communication with the first thermal fluid outlet line and second thermal fluid outlet line and a downstream junction in fluid communication with the first thermal fluid inlet line and second thermal fluid inlet line; and
a controller configured to selectively fluidly connect the first heat source assembly or the second heat source assembly to the shared assembly,
wherein the first heat source assembly defines a first maximum thermal fluid throughput,
wherein the second heat source assembly defines a second maximum thermal fluid throughput,
wherein the shared assembly defines a third maximum thermal fluid throughput, wherein the first maximum thermal fluid throughput is substantially equal to the second maximum thermal fluid throughput, and
wherein the second maximum thermal fluid throughput is substantially equal to the third maximum thermal fluid throughput.

* * * * *